(12) United States Patent
Liao et al.

(10) Patent No.: US 8,814,604 B2
(45) Date of Patent: Aug. 26, 2014

(54) MEMORY FASTENING DEVICE, COMPUTER MOTHERBOARD AND COMPUTER

(75) Inventors: Yingwen Liao, Shenzhen (CN); Lin Feng, Huanggang (CN); Tiansheng Feng, Huanggang (CN); Qiaozhen Pan, Huanggang (CN); Ping Feng, Huanggang (CN); Aiping Feng, Huanggang (CN)

(73) Assignee: Lin Feng, Shenzhen, Guangdong Province (CN)

( * ) Notice: Subject to any disclaimer, the term of this patent is extended or adjusted under 35 U.S.C. 154(b) by 0 days.

(21) Appl. No.: 13/392,367

(22) PCT Filed: Jan. 26, 2010

(86) PCT No.: PCT/CN2010/070366
§ 371 (c)(1),
(2), (4) Date: Feb. 24, 2012

(87) PCT Pub. No.: WO2011/022954
PCT Pub. Date: Mar. 3, 2011

(65) Prior Publication Data
US 2012/0164889 A1  Jun. 28, 2012

(30) Foreign Application Priority Data

Aug. 26, 2009  (CN) ...................... 2009 2 0204088 U

(51) Int. Cl.
*H01R 24/60* (2011.01)
(52) U.S. Cl.
USPC ....................................................... 439/630
(58) Field of Classification Search
USPC .................. 439/630, 325, 327, 260, 265, 267
See application file for complete search history.

(56) References Cited

U.S. PATENT DOCUMENTS

| | | | | |
|---|---|---|---|---|
| 4,129,351 A * | 12/1978 | Sugimoto et al. | ............. | 439/325 |
| 4,373,764 A * | 2/1983 | Ulrich | ............ | 439/327 |
| 4,591,222 A * | 5/1986 | Shaffer | ........... | 439/265 |
| 5,133,667 A * | 7/1992 | Daughtrey | ....................... | 439/67 |
| 5,156,553 A * | 10/1992 | Katsumata et al. | ............ | 439/62 |
| 5,273,450 A * | 12/1993 | Renn et al. | .................... | 439/260 |
| 5,378,161 A * | 1/1995 | Loder | ............ | 439/77 |
| 5,421,738 A * | 6/1995 | Roberts | ........ | 439/260 |
| 5,516,304 A * | 5/1996 | Yu | .................. | 439/326 |
| 5,564,931 A * | 10/1996 | Fabian et al. | .................. | 439/62 |
| 5,613,866 A * | 3/1997 | Niimura | ........ | 439/260 |
| 5,702,269 A * | 12/1997 | Uchida et al. | ............... | 439/496 |
| 6,213,804 B1 * | 4/2001 | Matsumura | ................... | 439/267 |
| 6,416,342 B2 * | 7/2002 | Matsumura | ................... | 439/267 |
| 6,618,942 B2 * | 9/2003 | Beaman et al. | ................. | 29/854 |
| 6,796,825 B2 * | 9/2004 | Wang | ............ | 439/326 |
| 7,331,810 B2 * | 2/2008 | Yang | ............ | 439/327 |
| 7,967,618 B2 * | 6/2011 | Chang | ............ | 439/157 |
| 2012/0164889 A1 * | 6/2012 | Liao et al. | .................... | 439/630 |

* cited by examiner

*Primary Examiner* — Alexander Gilman

(57) ABSTRACT

A memory fastening device, a computer motherboard including the memory fastening device and a computer including the computer motherboard are provided. The memory fastening device includes a memory connection base for plugging and fixing a memory and is characterized in further comprising an elastic component which fills in a space between the memory connection base and the memory. The memory fastening device is an improvement based on a conventional memory connection base. The memory fastening device is characterized in that a purpose of fastening the memory is realized without changing conventional structures of the standardized memory connection base and the standardized memory.

4 Claims, 5 Drawing Sheets

MEMORY FASTENING DEVICE, COMPUTER MOTHERBOARD AND COMPUTER

BACKGROUND OF THE PRESENT INVENTION

1. Field of Invention

The present invention relates to a field of electrical connecting structures, and more particularly to a memory fastening device, a computer motherboard having the memory fastening device and a computer having the computer motherboard.

2. Description of Related Arts

Computer crash, blue screen, a failure to start normally or a failure to enter the operating system after the start often occurs to a computer. Many reasons can cause that, but one main reason is the memory failure, including a memory corruption, an incompatibility and a failure in the connection between a memory connection base and a memory.

The incompatibility between the memory and the motherboard is caused by the memory and the motherboard, and can be detected at the initial phase of the installment. It is easy to detect and solve the incompatibility.

The failure in the connection between the memory and the memory connection base is the most common memory failure in daily lives and also the factor leading to the highest maintenance cost.

A conventionally standardized memory connection base is shown in FIG. 1. The memory connection base has a memory slot 11 and comprises socket arms 12 provided at two sides of the memory slot 11, fastener arms 13 provided at two ends of the memory slot 11, hook fasteners 14 hinged with the fastener arms 13 for fixing a memory, pins 15 provided at a bottom of the memory connection base and crossing through the memory slot 11 and elastic reeds 16 (not shown in drawings) connected to the pins 15 and provided in perforated holes 121 of the socket arms 12, wherein a plurality of heat emitting holes 122 are provided in upper ends of the socket arms 12.

A conventionally standardized memory bar is shown in FIG. 2. The memory 2 comprises a wiring board 21, memory granules 22 and electronic elements 23, wherein the memory granules 22 and the electronic elements 23 are welded on a side or two sides of the wiring board 21; two semi-circle bayonet connectors 211 are respectively provided at two ends of the wiring board 21; a plurality of connecting fingers 212 for contacting with the elastic reeds 16 are provided at a bottom of the two sides of the wiring board 21; a breach 213 for distinguishing a plugging direction of a memory is further provided at a bottom of the wiring board 21.

When the memory 2 is fully plugged into the memory slot 11, a front view of a connection structure of the memory 2 and the memory connection base 1 is shown in FIG. 3, wherein a "hook" 141 of the hook fastener 14 of the memory connection base and a lower end 2111 of the upper bayonet connector 211 at the two sides of the wiring board 21 are buckled with each other; a lower end of the wiring board 21 and a bottom 111 of the memory slot 11 are contacted with each other (marked with dotted lines).

The failure in the connection between the memory and the memory connection base may be caused by following reasons.

Firstly, dust comes into the memory slot of the memory connection base, which results in that the connecting fingers of the memory and the elastic reeds of the memory connection base are also attached with some dust. When the dust exists between the elastic reeds of the memory connection base and the connecting fingers of the memory, the electrical connecting performance of the memory and the memory connection base is changed so that a computer failure may occur. The memory connection base tends to have dust for the following reasons. On one hand, the memory connection base is very close to the CPU heat emitting fans. The rotation of the CPU heat emitting fans accelerates the air flow around the CPU connection base. With the increasing air flow volume, more dust brought by the air flow deposits around the memory. A great deal of dust exists between the memory connection base and the memory so that a poor contact or a short circuit may occur. On the other hand, as shown in FIG. 1, the plurality of heat emitting holes above the perforated hole which has electricity-conducting reeds of the memory connection base provided therein are open so that dust tends to enter between the memory slot and the memory through the plurality of heat emitting holes and the perforated holes, which leads to a poor contact or a short circuit between the memory and the memory connection base.

Secondly, the memory is loosened, which leads to a poor contact between the connecting fingers of the memory and the pins of the memory connection base and a weakened electrical connecting performance to result in a disorder of the memory in processing the computer data and further a computer failure such as a computer crash, a blue screen or a restart. A main reason for a loosened memory is that a movement or a shake made by man loosens the connection between the memory and the memory connection base. Moreover, an unreasonable design of a rigid connection structure between the memory connection base and the memory also leads to a loosened memory.

A conventional fastening structure between the memory and the memory connection base is shown in FIG. 3, wherein an "ear fastener" and the memory are connected in a rigid structure; the memory and the bottom of the memory slot of the memory connection base are also connected in a rigid structure. Actually, a rigid connecting structure is hardly able to work as a real fastener. However, a soft or an elastic connection structure between the memory and the memory connection base is able to work as a real fastener so that the connection between the memory and the memory connection base is free from being loosened by shaking.

Thirdly, the connecting fingers of the memory are oxidized. The elastic reeds of the memory connection base and the connecting fingers of the memory are exposed in the air and plated with gold on the surfaces without full protection (such as spraying protective agents). After a long time, the surfaces thereof are gradually oxidized and the coatings of gold are also carved by multiple insertions and pulls to further accelerate the oxidation. When the connecting fingers or the elastic reeds are oxidized, electrical connecting performance is severely affected as well as the data communication so that the computer system works unstably and unreliably. Especially under unstandardized maintenance, dust of the connecting fingers is often wiped by hand. The sweat on hands is left on the connecting fingers when people are wiping off the dust of the connecting fingers by hands. The certain amount of salt and water in the sweat not only accelerates the oxidation of the connecting fingers, but also changes a conductivity between the connecting fingers and the reeds and weakens the electrical connecting performance so as to greatly reduce a working stability of the computer.

Among the above three reasons, a loosened memory is able to directly or indirectly contribute to a deposit of dust on the memory and an oxidation of the connecting fingers of the memory. Thus it is important to solve the problem of a loosened memory in order to solve the electrical connection failure between the memory and the memory connection base.

The inventor has searched among the relevant patent files of State Intellectual Property Office of China and the published technical files of CNKI (China National Knowledge Infrastructure) and failed to find a conventional art to ingeniously solve the problem of a loosened memory. Some conventional arts are too complicated, another conventional arts change the structures of the conventional memory connection base and the memory, which belongs to an unstandardized design with poor serviceability, and others fail to radically solve the problem of a loosened memory.

SUMMARY OF THE PRESENT INVENTION

In order to overcome a failure to effectively solve a problem of a loosened memory existing in a conventional technology and to avoid over complicated conventional technologies, a simple and effective memory fastening method and a device thereof based are provided. The memory fastening method and device are based on structures of a conventional memory and a conventional memory connection base and have well serviceability.

The present invention has a following technical solution.

The present invention is based on following principles. A memory fastening method, wherein a memory is applied with forces at multiple directions through a memory connection base to fix the memory in the memory connection base, is characterized in that the force at one direction or more is an elastic stress.

The elastic stress has an action range spread over contact parts of the memory connection base and the memory.

The elastic stress is applied by an elastic element provided at the contact parts of the memory connection base and the memory.

The elastic element can be a spring, an elastic rubber or other elastic device.

It is preferred to adopt the elastic rubber as a consideration of insulation.

The memory connection base has a memory slot. The elastic element is provided at a bottom of the memory slot and fixedly connected to the bottom of the memory slot.

Thus, the present invention provides a memory fastening device comprising a memory connection base for plugging and fixing a memory. The memory connection base is characterized in further comprising an elastic element filling in space between the memory connection base and the memory.

The memory connection base has a memory slot and comprises slot arms provided at two sides of the memory slot, fastener arms provided at two ends of the memory slot and hook fasteners hinged with the fastener arms for fixing the memory. The elastic element is provided in an internal bottom of the memory slot for filling in space between the internal bottom of the memory slot and the memory.

The elastic element is connected to the internal bottom of the memory slot.

The elastic element is made of elastic insulating rubber.

The rubber is able to dilate after being heated, so it becomes necessary to consider a thermal expansion coefficient of the elastic element when designing the elastic element and a surface area of the elastic element is preferred to be slightly smaller than a surface area of the bottom of the memory slot.

The elastic element comprises an insulating rubber bar which is spread flat at the internal bottom of the memory slot.

The contact part of the elastic element and the memory is a flat surface whose area is 0-20% smaller than a surface area of the bottom of the memory slot.

The elastic element comprises a plurality of insulating rubber blocks which are discontinuously spread at the internal bottom of the memory slot.

The insulating rubber blocks are discontinuously spread so that there is a gap between each two insulating rubber blocks. When the memory is charged with electricity and begins to work, the memory gives off heat and the rubber blocks begin to dilate. The gaps provide room for the insulating rubber blocks to dilate so as to avoid pushing the memory up and loosening the memory caused by the dilated insulating rubber blocks.

The insulating rubber blocks are cubic whose width is identical to that of the memory slot.

Preferably, the insulating rubber blocks are cylindrical. An upper bottom surface thereof contacting with the memory is a circular plane. A cylindrical surface thereof contacts with the slot arms at the two sides of the memory slot.

A volume of the elastic insulating rubber block is in a thermal expansion range from 0 to 20%.

The memory fastening device further comprises an elastic pad for filling in space between the hook fastener and the memory and connected to the hook fastener.

The present invention further provides a computer motherboard characterized in that the computer motherboard comprises the above memory fastening device for plugging a memory and connected to the motherboard.

The computer motherboard is matched with a computer memory and provided on a computer.

The present invention further provides a computer comprising a computer motherboard and a memory and characterized in that the computer motherboard are the above computer motherboard.

The present invention has following beneficial results.

Firstly, by providing the elastic insulating rubber bar at the bottom of the memory slot of the memory connection base, without changing structures of the conventional memory connection base and the conventional memory, an elastic stress exists between the memory and the memory connection base and counteracts with an impact force of the memory when the memory is being shaken so as to maintain a fixed connection between the memory and the memory connection base, which is an ingenious design and has a simple structure and a wide application range.

Secondly, the elastic insulating rubber blocks are discontinuously spread at the internal bottom of the memory slot to efficiently avoid loosening the memory caused by the dilation of the being heated elastic insulating rubber blocks.

DETAILED DESCRIPTION OF THE PREFERRED EMBODIMENT

Figure 1:
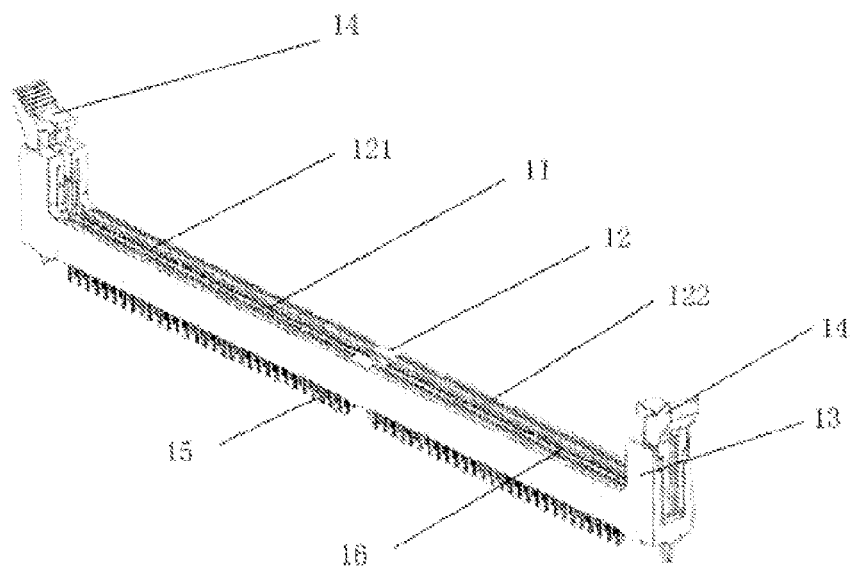
FIG. 1 is a perspective view of a memory connection base according to the prior art.
Figure 2:
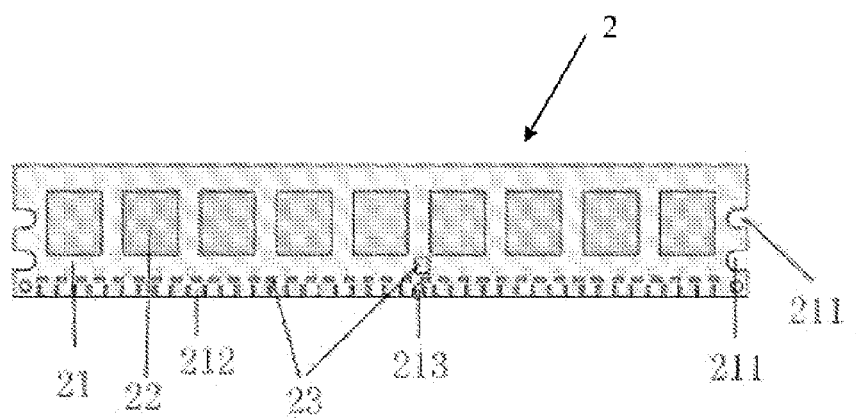
FIG. 2 is a front view of a memory according to the prior art.
Figure 3:
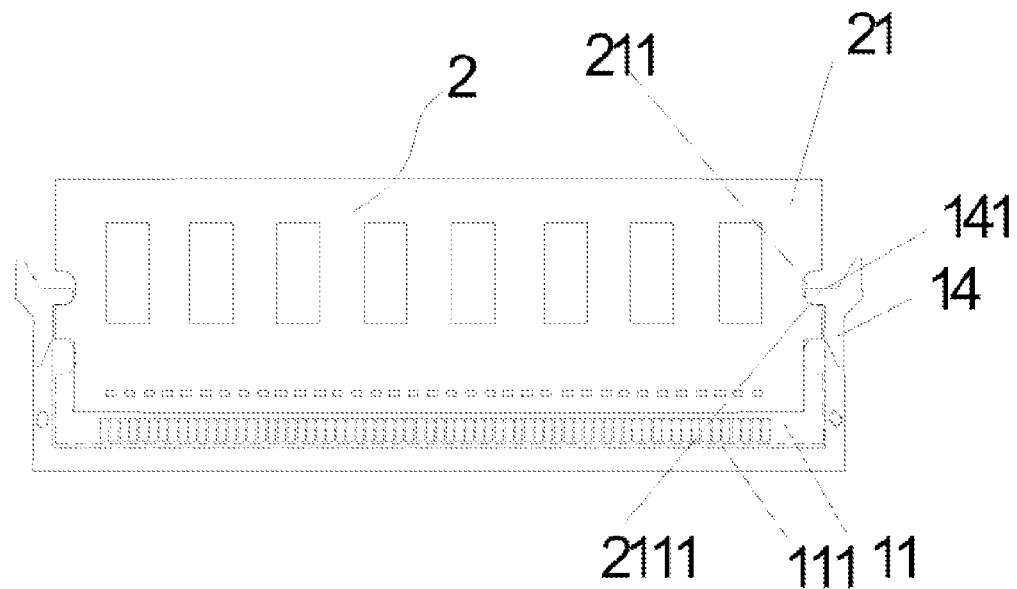
FIG. 3 is a front view of the memory plugged in the memory connection base according to the prior art.

The present invention relates to a memory fastening device which is an improvement based on a conventional memory connection base. The present invention is characterized in that a purpose of fastening a memory is realized without changing conventional structures of a standardized memory connection base and a standardized memory, which has a low cost, an ideal result and a great potential on the market.

The present invention is realized by following principles.

A conventional memory is plugged into a memory slot of a memory connection base. The bayonet connector of the memory is buckled by a hook fastener to fix the memory. When installing the memory, by pressing the memory downwards with hands, the memory is plugged into the memory slot. Once a lowest end of the memory contacts with a bottom of the memory slot, the bayonet connectors of the memory are exactly buckled by the hook fastener of the memory connection base. The hook fastener resists the memory at a direction the memory drops, so it is not easy for the memory to drop without pulling open the hook fastener.

In a conventional art, the hook fastener, the memory slot and the wiring board of the memory are plastic with some rigidity. When the hook fastener of the memory connection base just sticks into the bayonet connectors of the memory, the lowest end of the memory is supposed to just contact with the bottom of the memory slot, or the memory fails to be plugged into the memory slot, or the memory is still able to move up and down after being plugging into the memory slot, in that case when the computer is shaken the memory movable in the memory slot tends to be loosened. Thus it not only brings a strict requirement of accuracy to designs of the memory connection base and the memory, but also, even if a size of the memory is just able to satisfy a size requirement of the memory slot, a rigid connection structure tends to loosen the hook fastener outwards when the computer is shaken (the forces between the hook fastener and the memory are not so strong so that a friction force therebetween is weak) to further loosen the memory bar off (without being fastened and pressed by the hook fastener).

The present invention provides a memory fastening device according to a principle that an elastic device has a damping effect (an elastic stress produced by an elastic device is able to counteract with an impact force produced by shaking).

The memory loosens or drops at a direction pointing out of the memory slot. The bottom of the memory slot resists the memory and the hook fastener tends to be loosened outwards, so fixing the memory not only requires preventing the memory from dropping but also requires preventing the memory from being loosened. The memory drops mainly because the hook fastener is loosened outwards and there is a gap in a contacting part between the memory connection base and the memory.

Thus the present invention not only needs to solve a problem of a too weak friction force between the hook fastener of the memory connection base and the memory, but also needs to solve the gap existing in the contacting part between the memory connection base and the memory.

Combined with preferred embodiments, a technical solution adopted by the present invention to solve the above technical problems is illustrated in details. Based on the conventional memory connection base, the present invention provides an innovative memory fastening device.

A First Preferred Embodiment

Figure 4:
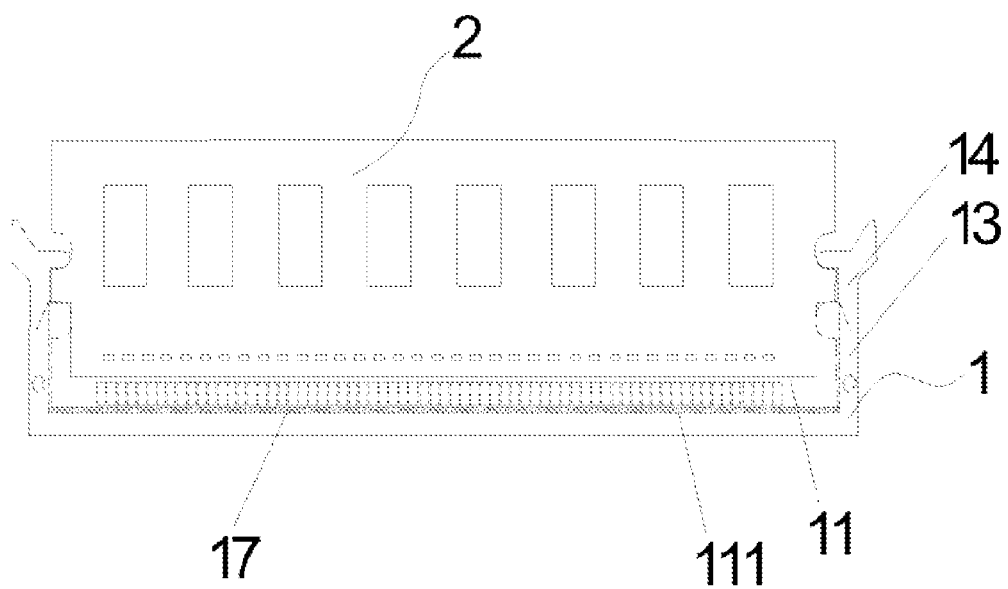
FIG. 4 is a front view of a memory fastening device according to a first preferred embodiment of the present invention.
Figure 5:
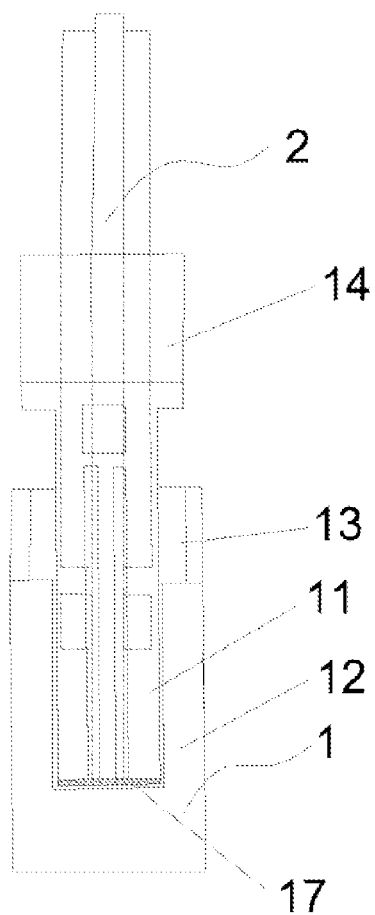
FIG. 5 is a side view of the memory fastening device according to the first preferred embodiment of the present invention.
Figure 6:
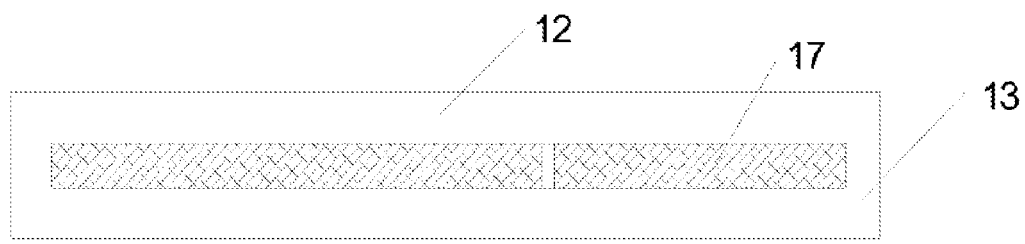
FIG. 6 is a top view of the memory fastening device according to the first preferred embodiment of the present invention.

Referring to FIG. 4 to FIG. 6, a memory fastening device 1 comprises a memory connection base for plugging and fixing a memory. The memory connection base has a memory slot 11, slot arms 12 provided at two sides of the memory slot 11, fastener arms 13 provided at two ends of the memory slot 11 and hook fasteners 14 hinged with the fastener arms 13 for buckling up the memory. The memory fastening device 1 further comprises an elastic element 17 which is provided at a bottom of the memory slot 111 and connected to the bottom of the memory slot 111.

The elastic element 17 is an insulating elastic rubber bar which is spread flat at the bottom of the memory slot 111. A contacting surface between the elastic element 17 and the memory 2 is flat. A contacting surface between the elastic element 17 and the bottom of the memory slot 111 is also flat. The elastic element 17 and the bottom of the memory slot 111 are stick together. The contacting surface between the elastic element 17 and the memory 2 has no material to be stuck together. When the memory 2 is pulled out of the memory slot 11, the elastic element 17 stays without being dragged out.

The insulating elastic rubber bar has an identical width to the memory slot 11, an identical length to the memory slot 11 and a thickness around 2 mm, in such a manner that the memory is still able to be plugged into the memory slot 11 after providing the insulating elastic rubber bar and that the elastic stress of the insulating elastic rubber bar is not too strong after buckling up the hook fastener 14, or the memory bar is pushed and resisted and the wiring board of the memory bar is deformed or broken.

When designing the insulating elastic rubber bar, designers are required to consider a twisting force the wiring board of the memory bears, a distance between the memory and the memory slot 11, an elasticity coefficient of the insulating elastic rubber bar and so on to set a thickness of the elastic insulating rubber bar.

A Second Preferred Embodiment

In the first preferred embodiment, the insulating elastic rubber bar is required to fix the memory not only when the memory gives off heat but also at ordinary temperatures. The insulating elastic rubber bar has a certain thermal expansion coefficient. At the ordinary temperatures, a fastening force between the memory and the memory connection base is strong enough. However, when the memory gives off heat, the insulating elastic rubber bar begins to dilate to further strengthen the fastening force between the memory and the memory connection base. Once the insulating elastic rubber bar is over dilated, the memory would be pushed up to become deformed so that a working stability of the memory is affected and even the memory can be damaged. Meanwhile, when the insulating elastic rubber bar becomes larger after being heated, a transversal dilation thereof is limited by the clipping memory slot, in such a manner that, once the insulating elastic rubber bar is heated and dilates to some degrees, a certain part thereof would hump and the memory would deform or displace. In order to avoid this result, the insulating elastic rubber bar is required to have a thermal expansion coefficient from 0 to 20%.

Figure 7:
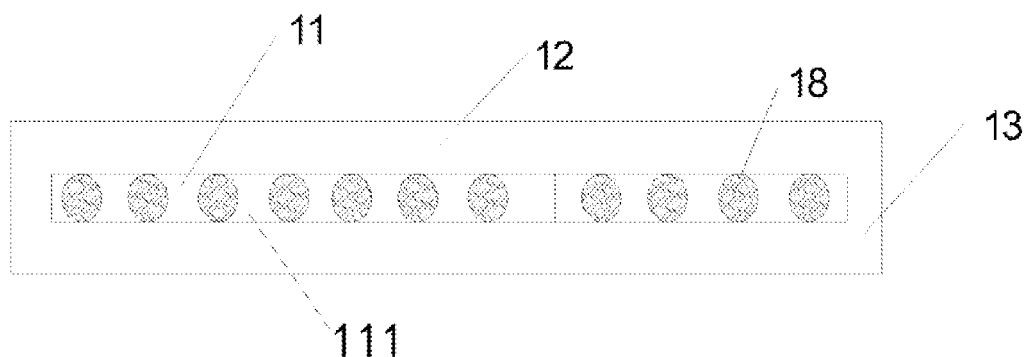
FIG. 7 is a top view of a memory fastening device according to a second preferred embodiment of the present invention.
Figure 8:
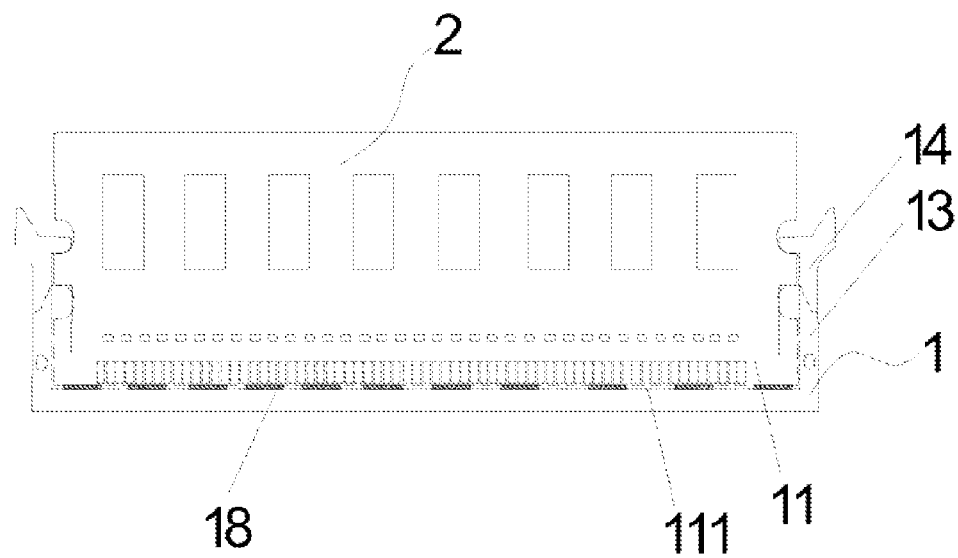
FIG. 8 is a front view of the memory fastening device according to the second preferred embodiment of the present invention.

Based on the first preferred embodiment, in order to reduce an outwardly pushing force brought by the thermally expanded elastic element 17, the insulating elastic rubber bar in the first preferred embodiment is divided into a plurality of small insulating elastic rubber blocks 18 as shown in FIG. 7 and FIG. 8. The plurality of insulating elastic rubber blocks 18 are discontinuously spread at the internal bottom 111 of the memory slot 11. There are gaps among the plurality of insulating elastic rubber blocks 18, in such a manner that, under the thermal expansion, the plurality of insulating elastic rubber blocks 18 are squeezed by the memory and the memory connection base to become transversally deformed along a direction paralleling with the internal bottom of the memory slot hardly with any change of a thickness thereof.

The plurality of insulating elastic rubber blocks 18 are cylindrical or cubic. Preferably, as the second preferred embodiment shows, the plurality of insulating elastic rubber blocks 18 are cylindrical, wherein an upper bottom surface thereof contacting with the memory is a circular plane; a cylindrical surface thereof contacts with the slot arms 12 at the two sides of the memory slot 11.

A Third Preferred Embodiment

Figure 9:
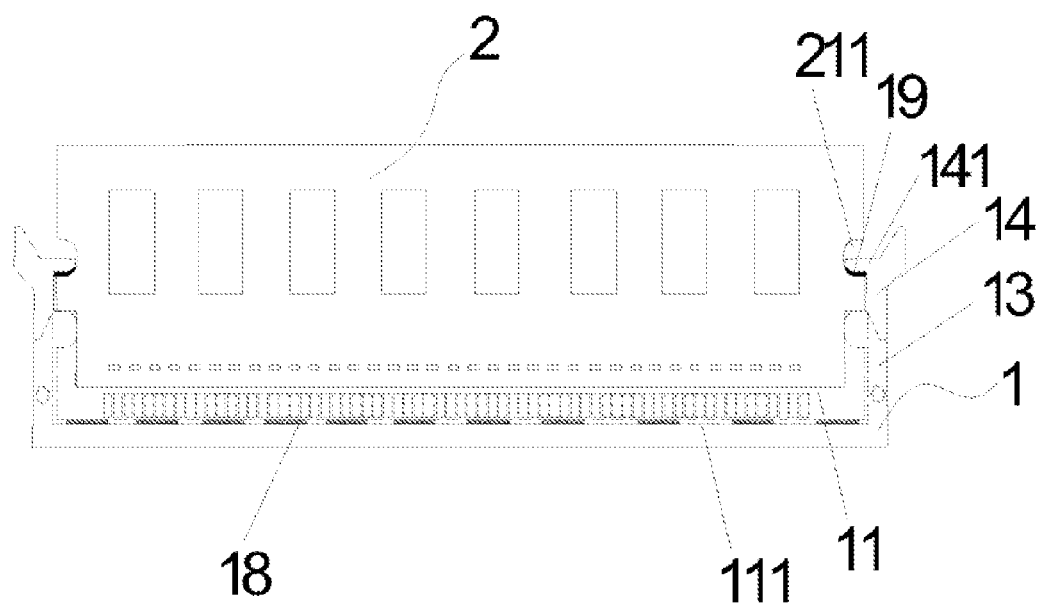
FIG. 9 is a front view of the memory fastening device according to a third preferred embodiment of the present invention.

Based on the second preferred embodiment, as a result of the dilation of the elastic element 17, the memory upwardly pushes the hook fastener to strengthen a force between the memory and the hook fastener. Accordingly a friction force therebetween is strengthened. When the computer is shaken, it is not easy for the hook fastener to be loosened toward the two sides of the memory slot. Furthermore, the memory and the hook fastener are plastic and the friction force therebetween is still too weak. In order to strengthen the friction force therebetween while protecting the memory from damages, as shown in FIG. 9, an elastic pad 19 is provided below a "hook" 141 by which the hook fastener 14 and a bayonet connector 211 of the memory 2 are buckled up, wherein the elastic pad 19 is connected to the "hook" 141 of the hook fastener 14 in a way of sticking. The elastic pad 19 obviously strengthens the friction force between the memory and the hook fastener by contacting with the bayonet connector 211 of the memory 2 while protecting the bayonet connector 211 of the memory 2 from being damaged by the hook fastener. Thus the memory fastening device 1 further comprises the elastic pad 19 which has an identical surface with a lower bottom surface by which the "hook" 141 of the hook fastener 14 contacts with the memory, wherein the elastic pad 19 is 0.5 mm to 1 mm thick.

In the third preferred embodiment, the elastic element 17 and the elastic pad 19 not only strengthen the friction force between the hook fastener 14 and the memory to prevent the memory from dropping, but also eliminate the gap between the memory and the memory connection base, so as to effectively solve a problem of a loosened memory.

In all the above preferred embodiments, the memory fastening device is able to be applied to ordinary computer motherboards, a computer motherboard comprising the memory fastening device is also able to match with ordinary memories and be applied to ordinary computers.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A memory fastening device comprising a memory connection base for plugging and fixing a memory, wherein said memory fastening device further comprises an elastic element which fills in a space between said memory connection base and the memory, so as to strengthen a friction force between the memory connection base and the memory to prevent the memory from dropping, and eliminate the gap between the memory and the memory connection base, so as to effectively solve a problem of a loosened memory, wherein said memory connection base has a memory slot and comprises slot arms provided at two sides of said memory slot, fastener arms provided at two ends of said memory slot and hook fasteners hinged with said fastener arms for fixing the memory; said elastic element is provided at an internal bottom of said memory slot for filling in a space between said internal bottom of said memory slot and the memory, wherein said elastic element is connected to said internal bottom of said memory slot, wherein said elastic element are made of elastic insulating rubber, wherein said elastic element comprises an insulating rubber bar which is spread flat at said internal bottom of said memory slot, wherein said elastic insulating rubber bar has a thermal expansion range of volume from 0 to 20%; a surface by which said elastic element contacts with the memory is flat and has an area 0 to 20% smaller than a surface area of a bottom of said memory slot, in such a manner that said memory is applied with forces at multiple directions through said memory connection base to fix said memory in said memory connection base, wherein said force at one direction or more is an elastic stress, wherein the elastic element and the elastic pad not only strengthen the friction force between the hook fastener and the memory to prevent the memory from dropping, but also eliminate the gap between the memory and the memory connection base, so as to effectively solve a problem of a loosened memory.

2. The memory fastening device, as recited in claim 1, wherein said insulating rubber block is cylindrical; an upper bottom face thereof contacting with the memory is a circular plane; a cylindrical surface thereof contacts with said slot arms at said two sides of said memory slot.

3. The memory fastening device, as recited in claim 1, wherein said insulating rubber block is cylindrical; an upper bottom face thereof contacting with the memory is a circular plane; a cylindrical surface thereof contacts with said slot arms at said two sides of said memory slot.

4. A memory fastening device comprising a memory connection base for plugging and fixing a memory, wherein said memory fastening device further comprises an elastic element which fills in a space between said memory connection base and the memory, so as to strengthen a friction force between the memory connection base and the memory to prevent the memory from dropping, and eliminate the gap between the memory and the memory connection base, so as to effectively solve a problem of a loosened memory, wherein said memory connection base has a memory slot and comprises slot arms provided at two sides of said memory slot, fastener arms provided at two ends of said memory slot and hook fasteners hinged with said fastener arms for fixing the memory; said elastic element is provided at an internal bottom of said memory slot for filling in a space between said internal bottom of said memory slot and the memory, wherein said elastic element is connected to said internal bottom of said memory slot, wherein said elastic element are made of elastic insulating rubber, wherein said elastic element comprises a plurality of insulating rubber blocks which are discontinuously spread at said internal bottom of said memory slot, so that there is a gap between each two insulating rubber blocks, when the memory is charged with electricity and begins to work, the memory gives off heat and the rubber blocks begin to dilate, the gaps provide room for the insulating rubber blocks to dilate so as to avoid pushing the memory up and loosening the memory caused by the dilated insulating rubber blocks.

\* \* \* \* \*